Aug. 14, 1945.   O. W. BONNAFE   2,381,998
ROTATABLE BROACH HOLDER
Filed Dec. 7, 1942   4 Sheets-Sheet 1

Inventor
Oliver W. Bonnafe

Aug. 14, 1945.   O. W. BONNAFE   2,381,998
ROTATABLE BROACH HOLDER
Filed Dec. 7, 1942   4 Sheets-Sheet 2
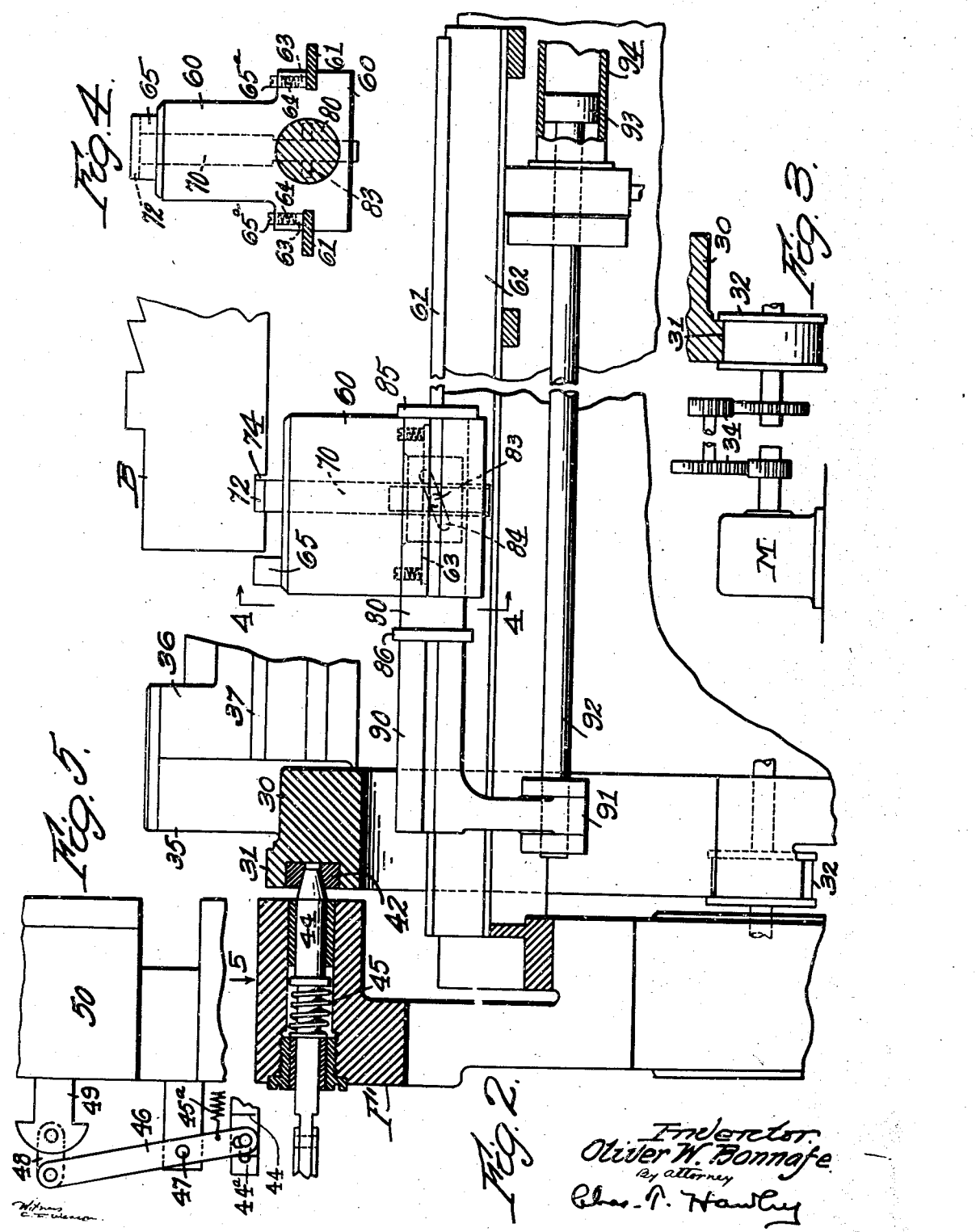
Inventor.
Oliver W. Bonnafe
By attorney
Chas. T. Hawley Aug. 14, 1945.   O. W. BONNAFE   2,381,998
ROTATABLE BROACH HOLDER
Filed Dec. 7, 1942   4 Sheets-Sheet 3
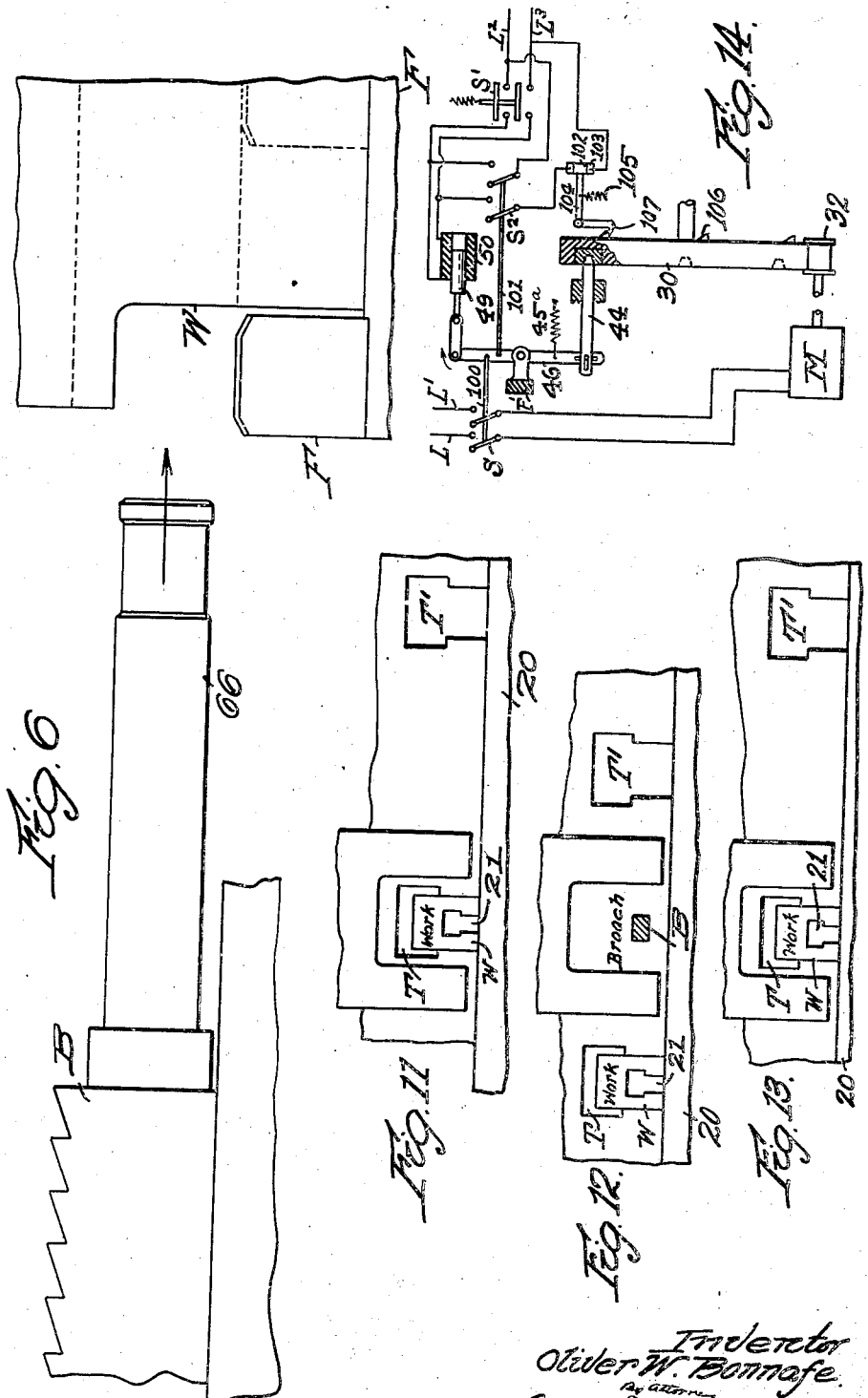

Aug. 14, 1945.　　　O. W. BONNAFE　　　2,381,998
ROTATABLE BROACH HOLDER
Filed Dec. 7, 1942　　　4 Sheets-Sheet 4
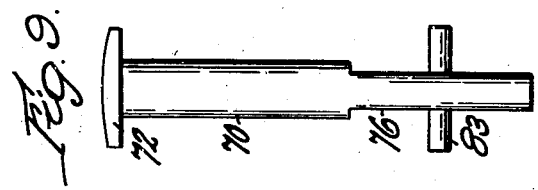
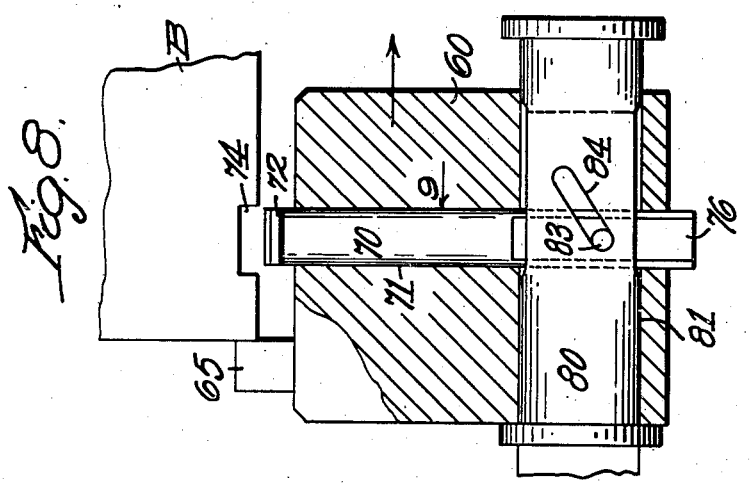
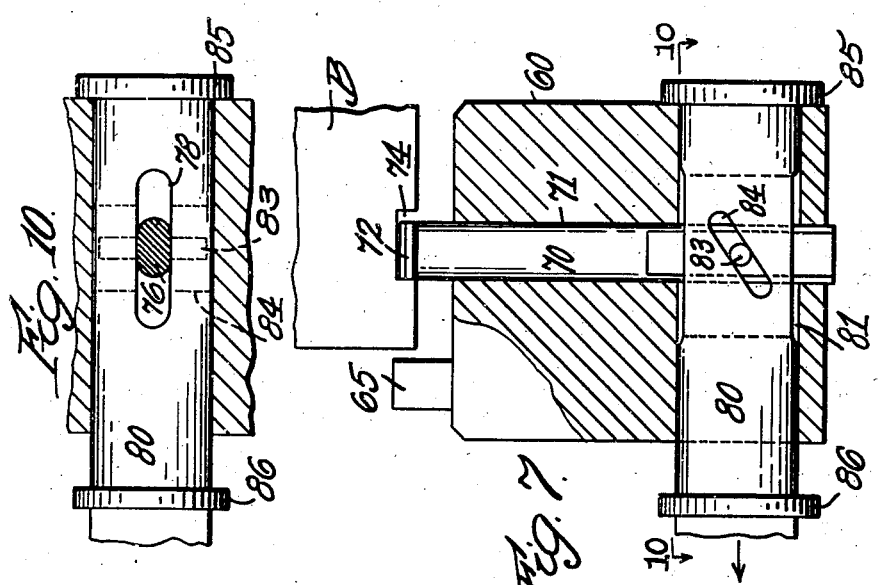
Inventor
Oliver W. Bonnafe
By attorney
Chas. T. Hawley Patented Aug. 14, 1945

2,381,998

UNITED STATES PATENT OFFICE 2,381,998

ROTATABLE BROACH HOLDER

Oliver W. Bonnafe, Hudson, Mass., assignor to The Lapointe Machine Tool Company, Hudson, Mass., a corporation of Maine Application December 7, 1942, Serial No. 468,299

14 Claims. (Cl. 90—33)

This invention relates to horizontal broaching machines in which successive broach operations by a series of different broaches are performed on each work piece while in a single and central broaching position.

It is the general object of my invention to provide a broach holder for a plurality of broaches, rotatable about a horizontal axis and in which a plurality of long and heavy broaches may be conveniently stored and from which they may be successively moved to operative position.

Further features of the invention relate to means for firmly but slidably supporting each broach in the broach holder, for automatically indexing the holder, and for moving the broaches by power means into or out of the broach holder. I also provide a latch device to engage an operatively positioned broach and which is moved to operative or inoperative position relative to the broach by utilizing a predetermined and limited lost-motion in the actuating means.

My invention further relates to certain arrangements and combinations of parts which will be hereinafter described and more particularly pointed out in the appended claims.

A preferred form of the invention is shown in the drawings, in which

Fig. 2 is a partial sectional front elevation of the broach holder and certain associated parts;

Fig. 3 is a detail front elevation of a motor drive for the broach holder;

Fig. 4 is an end elevation of a broach actuator, taken along the line 4—4 in Fig. 2;

Fig. 5 is a detail plan view of parts of an indexing mechanism, looking in the direction of the arrow 5 in Fig. 2;

Fig. 6 is a diagrammatic and partial front elevation, illustrating the travel of the broach relative to the fixed frame and the transversely movable work support;

Fig. 7 is a sectional front elevation of the broach actuator and certain associated parts;

Fig. 8 is a view similar to Fig. 7 but showing certain parts in different operative relation;

Fig. 9 is a side elevation of a latching plunger, looking in the direction of the arrow 9 in Fig. 8;

Fig. 10 is a detail sectional plan view, taken along the line 10—10 in Fig. 7;

Figs. 11, 12 and 13 are diagrammatic views illustrating the transverse shifting of the work to broaching and clearance positions; and Fig. 14 is a wiring diagram showing an electrical control for the indexing mechanism.

Figure 1:
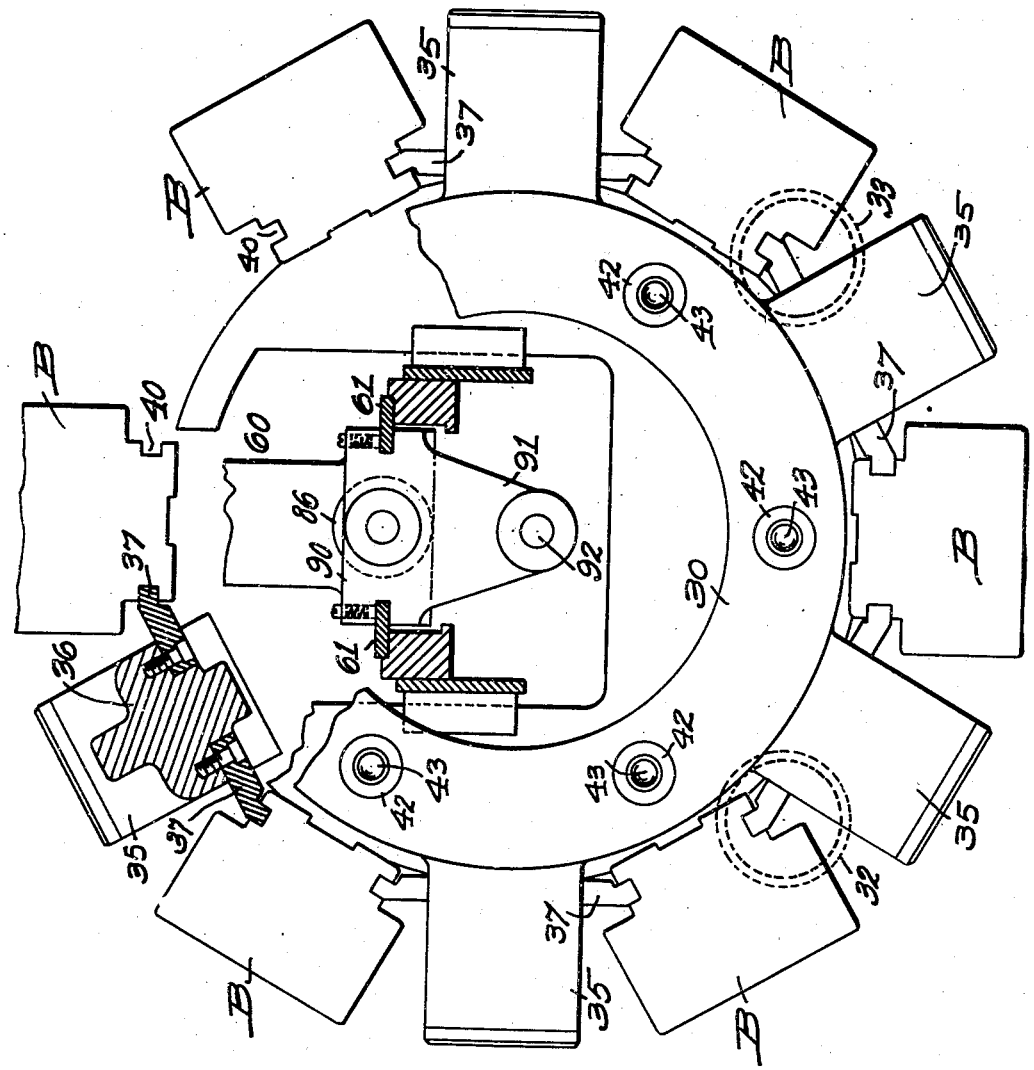
Fig. 1 is a rear end elevation of my improved broach holder, partly broken away and in section.

While capable of other applications, my present invention was particularly designed for use in a horizontal pull-type broaching machine in which a large opening in a heavy casting or forging may be machined to finished size by pulling a series of large and heavy broaches successively through said opening to be broached.

My preferred work cycle for such a machine is as follows:

Starting with the work in central or broaching position and with the No. 1 or active broach inserted through the opening in the work and locked to the main ram, the broach is then pulled through the work in the usual way, preferably by hydraulic mechanism and until the rear end of the broach is clear of the work.

The transversely movable work support is then shifted to move the work to a side or clearance position, out of alignment with the active broach. The broach is then returned to the position which it occupied when the broaching stroke was about to begin. A broach actuator in the rotatable work holder then engages the rear end of the No. 1 broach and pulls the broach rearward along guideways in the broach holder until the forward end of the broach clears the work. The broach holder is then angularly advanced and indexed to bring the No. 2 broach in broaching position, after which the work is returned to central position and the broach actuator pushes the No. 2 broach through the work by a reverse or forward movement. As this movement is completed, the broach engages and is locked in the main ram, after which the cycle of operations is repeated.

The successive positions of the work are indicated diagrammatically in Figs. 11, 12 and 13. A work support 20 is mounted to slide transversely on the fixed frame F (Fig. 6) of the machine and is provided with two work-holding stations T and T1. A piece of work W is shown as secured in work station T in any convenient way. An opening to be broached in its upper and wider portion is indicated at 21.

In Fig. 11, the station T and work W is in central or broaching position and the opening 21 is in alignment with the main ram and with the active broach B.

In Fig. 12, the broach B has been pulled through the work W, the work support 20 has been shifted to the left to remove the work W transversely from broaching position to clearance position, and the idle return movement of the No. 1 broach B is about to occur.

In Fig. 13 the No. 1 broach B has been returned to the broach holder and the work W has been returned to broaching position and is ready to permit advance movement of the No. 2 broach through the opening 21 to engage the main ram.

In Figs. 11 and 13 it will be noted that the work station T1 is substantially removed transversely from the field of active broaching operations, so that a finished work piece may be removed from the station T1 and a new work piece may be clamped in position in the station T1 while the broaching of the work W clamped in the work station T is taking place. After the work W in the station T has been finished, the support 20 is shifted further to the left to bring the new work piece in the station T1 into broaching position.

My present invention relates particularly to the rotatable broach holder in which the idle broaches are stored, to means for driving and indexing the work holder, and to the broach actuator which slides the heavy broaches into and out of storage position in the broach holder.

Referring to Figs. 1 and 2, my improved broach holder comprises a pair of end members 30, each provided with an external annular surface 31 supported on grooved rollers 32 and 33. The roller 32 at the rear or left-hand end of the broach holder (as viewed in Fig. 2) is power-driven in any convenient manner as by a motor M (Fig. 3) through compound gearing 34. The roller 33 at the rear end is an idle roll, as are also the corresponding supporting rollers 32 and 33 at the front end. The rotatable work holder is thus supported entirely on the external bearing surfaces 31 and is frictionally driven by the rear roller 32, so that the work holder may stop without damage if its rotation is in any way interrupted.

The annular end members 30 are provided with spaced and outwardly projecting portions 35 which are connected by rigid longitudinal frame members or girts 36, each of which supports guide-bars 37 (Fig. 1) at its opposite sides. These guide-bars cooperate in pairs to receive and slidably support the broaches B, as clearly shown in Fig. 1.

The broaches B are recessed as indicated at 40 to receive the guide-bars 37 and each broach is thus firmly but slidably supported in the rotatable work holder. This firm support of the broaches is very important, as these broaches are of large cross section and very considerable length and may each weigh several hundred pounds.

The rear annular end member 30 (Fig. 2) is provided with a spaced series of hardened bushings 42, each having a cone-shaped hole 43. The bushings 42 are accurately spaced to correspond with the spacing of the outwardly projecting end portions 35 and of the stored broaches B.

An index plunger 44 (Figs. 2 and 5) is slidably mounted in a fixed frame member F1, and the tapered end of the plunger 44 is yieldingly pressed toward locking position by a relatively heavy spring 45. At its outer end, the plunger 44 is connected to a lever 46 mounted on a fixed pivot 47 and connected at its opposite end by a link 48 to the plunger 49 of a solenoid coil 50.

When the solenoid coil is energized, the plunger 49 is drawn into the coil 50 and the locking plunger 44 is moved outward to release the work holder. When the solenoid circuit is broken, the spring 45 returns the plunger 44 to locking position. The electrical control of the motor M and solenoid 50 will be hereinafter described. An auxiliary spring 45a may be provided for the lever 46.

I have provided a broach actuator 60 (Figs. 2, 4 and 7) slidable on guideways 61 mounted on girts 62, the ends of which girts are secured to the fixed frame members F and F1 of the broaching machine. Friction bars 63 (Figs. 2 and 4) are inserted at the sides of the actuator 60 and are yieldingly pressed against the guide-bars 61 by compression springs 64 and retaining screws 65a. The purpose of the friction bars 63 will be hereinafter explained.

At its upper end, the actuator 60 has a rigid cross flange or lug 65 adapted to engage the rear end of a broach B and to slide the broach forward along its guide-bars 37 until its reduced forward end portion 66 extends through the work W and into engagement with the main ram.

A latching plunger 70 is vertically slidable in an opening 71 in the actuator 60, and is provided at its upper end with a cross flange 72 adapted to enter a notch 74 in the under side of the rear end of the broach B. The latching plunger 70 is slabbed off as indicated at 76 in its lower part to enter a longitudinal slot or opening 78 in a cylindrical member 80 which is freely slidable in a corresponding opening 81 (Fig. 7) in the actuator 60.

The plunger 70 also has a cross-pin 83, the ends of which project outward through inclined cam slots 84 in the side walls of the member 80. Flanges 85 and 86 limit the sliding movement of the member 80 relative to the actuator 60.

When the member 80 is moved to the position shown in Fig. 7, the cam slots 84 coact with the cross pin 83 to raise the plunger 70 and cross bar 72 to operative engagement with the notch in the broach B. Further rearward movement of the actuator 60 to the left in Fig. 7 will then cause the latch bar 72 to effect a return movement of the broach B.

Movement of the member 80 to the position shown in Fig. 8 will fully depress the plunger 70 and latch 72, so that the broach B may be free for continued forward and operative movement by the main ram, after it has been moved into engagement therewith by the rigid cross flange 65.

The member 80 is integral with or secured to a carrier 90 (Fig. 2), slidable on the fixed guide-bars 61 previously described and having a depending arm 91 to which the free end of a piston rod 92 is secured. At its other end, the rod 92 is provided with a piston 93 slidable in a fixed cylinder 94. Suitable provision is made for selective admission of oil under pressure at the opposite ends of the cylinder 94.

When the piston rod 92, carrier 90 and member 80 are moved rearward or to the left in Fig. 2, the member 80 first moves to the position shown in Fig. 7 relative to the actuator 60, thus raising the latch bar 72 to operative position. Continued movement of the piston 93 to the left draws the previously operative broach B into its guideway in the broach holder.

The friction bars 63 in the actuator 60 by engagement with the fixed guide-bars 61 insure the lost-motion shift of the member 80 relative to the actuator 60 before actual movement of the actuator in either direction begins.

It will be noted that the cross flange 65 and the latch bar 72 both engage the broaches B in such manner that there is no interference with circumferential movement of the broaches with the broach holder.

The automatic indexing of the work holder will now be explained, with particular reference to Fig. 14.

The line wires for the motor M which drives the rear roller 32 and rotates the broach holder are indicated at L and L1, and the motor may be controlled by a double pole switch S. The line wires for the solenoid coil 50 are indicated at L2 and L3, and the solenoid may be energized by manual closing of a normally open double pole switch S1.

The motor switch S is connected by a rod 100 to the lever 46 which actuates the locking plunger 44. A double pole holding switch S2 is provided in a by-pass connection around the hand-operated and normally open switch S1. The switch S2 is connected by a rod 101 to the lever 46.

A pair of contacts 102 and 103 are placed in one wire of the holding circuit which is controlled by the switch S2. The contact 102 is movably mounted on a bell crank 104 and is normally held against the contact 103 by a spring 105.

A cam lug 106 is provided on the annular end member 30 for each broach-holding position. When any one of these cam lugs engages the inclined end 107 of the bell crank 104, the bell crank is moved to separate the contacts 102 and 103, thus breaking the holding circuit of the solenoid 50.

The manner in which my improved indexing mechanism operates is as follows:

Assuming that a broach has completed its cut and has been returned to the broach holder and that it is desired to index the broach holder, the hand switch S1 is momentarily closed by the operator. This completes a circuit through the solenoid 50, drawing the plunger 49 into the solenoid coil and moving the locking plunger 44 out of locking position. The same movement of the solenoid plunger 49 and lever 46 closes the motor switch S and starts the motor M to angularly advance the rotatable work holder. The lever 46 also closes the holding switch S2 which by-passes the switch S1, so that the motor M will continue to operate after the hand switch S1 has been released.

Rotation of the broach holder then continues until one of the cam lugs 106 on the end member 30 engages the bell crank 104 and separates the contacts 102 and 103, thus breaking the holding circuit of the solenoid coil 50 and releasing the solenoid plunger 49, lever 46 and locking plunger 44.

The lugs 106 are so located that this release of the plunger 44 takes place slightly before the corresponding index bushing 42 reaches index position. The inertia of the parts, however, is sufficient to advance the work holder far enough to bring the coacting bushing 42 in alignment with the plunger 44, even if the motor switch S has been opened on release of the solenoid plunger 49.

The cam lugs 106 are of such circumferential extent that the bell crank 104 will be released and the contacts 102 and 103 will be reengaged as the broach holder comes to index position or immediately after the next indexing movement is started.

It will thus appear that by momentarily closing the switch S1, a complete and automatic indexing cycle is initiated which advances the work holder one broach position and which accurately indexes and locks the broach holder in its new position.

Limited lost motion may be provided between the lever 46 and the plunger 44 to permit the switch S which controls the motor M to be opened, slightly before the plunger 44 enters the next index hole 43. For this purpose a slot 44a is formed in the plunger 44 (Fig. 5).

After the indexing movement of the holder has been completed to bring the next broach to broaching position, pressure is admitted to the left end of the cylinder 94 to move the piston rod 92 and actuator 60 to the right and to advance the fresh broach to engage the main ram and to be locked thereto. The broach is then pulled to the right by the ram for a broaching stroke and is thereafter returned to the left, but with the work in non-broaching position.

Reversal of pressure in the cylinder 94 then moves the piston rod 92 to the left. Lost motion between the cylindrical member 80 and the actuator 60 causes the latch 72 to be raised before the return stroke of the actuator begins. Movement of the actuator to the left then causes the latch to draw the used broach into the rotatable holder. The work is then returned to broaching position and the broach holder is indexed to advance the next broach to broaching position.

I am thus able to perform a series of broaching operations on a work piece by successive use of a plurality of very heavy broaches, without requiring any manual handling of the broaches at any time in the operation of the machine.

Having thus described my invention and the advantages thereof, I do not wish to be limited to the details herein disclosed, otherwise than as set forth in the claims, but what I claim is:

1. In a broaching machine, a broach holder mounted to rotate about a horizontal longitudinal axis of said machine, a plurality of angularly spaced guideways in said holder for a plurality of elongated broaches, power means to slide a broach into and out of any one of said guideways, means to lock said holder in successive broach-delivery positions, power means to advance said holder angularly to successive delivery positions, control devices effective to successively unlock said holder and start said power means, and automatic means to release said locking means and to cut off said power means when a predetermined angular advance of said holder is substantially accomplished.

2. In a broaching machine, a broach holder mounted to rotate about a horizontal longitudinal axis of said machine, a plurality of angularly spaced guideways in said holder for a plurality of elongated broaches, power means to slide a broach into and out of any one of said guideways, means to lock said holder in successive broach-delivery positions, power means to advance said holder angularly to successive delivery positions, control devices effective to successively unlock said holder and start said power means, and automatic means to release said locking means and to cut off said power means when a predetermined angular advance of said holder is substantially accomplished, and said predetermined angular advance being completed by the inertia of said holder and being terminated by the operation of said released locking means.

3. In a broaching machine, a broach holder mounted to rotate about a horizontal longitudinal axis of said machine, a plurality of angularly spaced guideways in said holder for a plurality of elongated broaches, power means to slide a broach into and out of any one of said guideways, means to lock said holder in successive broach-delivery positions, power means to advance said holder angularly to successive delivery positions, control devices effective to successively unlock said holder and start said power means, means to thereafter hold said power means in operation, and automatic means to release said locking means and to cut off said power means when a predetermined angular advance of said holder has been substantially accomplished.

4. In a broaching machine, a broach holder mounted to rotate about a horizontal longitudinal axis of said machine, a plurality of angularly spaced guideways in said holder for a plurality of elongated broaches, power means to slide a broach into and out of any one of said guideways, said holder having spaced index holes at one end thereof, a locking plunger normally seated in one of said holes when a broach in said holder is in delivery position, power means to advance said holder angularly, control devices effective to successively withdraw said plunger and start said power means, means to thereafter hold said power means in operation, and automatic means to release said plunger and said power means when a predetermined angular advance of said holder is substantially accomplished.

5. In a broaching machine, a broach holder mounted to rotate about a horizontal longitudinal axis of said machine, a plurality of angularly spaced broach guideways in said holder for a plurality of elongated broaches, power means to slide a broach into and out of any one of said guideways, said holder having spaced index holes at one end thereof, a locking plunger normally seated in one of said holes when a broach in said holder is in a delivery position, power means to advance said holder angularly, control devices effective to successively withdraw said plunger and start said power means, means to thereafter hold said power means in operation, and automatic means to release said plunger and said power means when a predetermined angular advance of said holder is substantially accomplished, and said holder continuing to advance by the inertia thereof until said released plunger enters the next index hole at the end of said holder.

6. In a broaching machine, a broach holder mounted to rotate about a horizontal longitudinal axis of said machine, a plurality of angularly spaced guideways in said holder for a plurality of elongated broaches, power means to slide a broach into and out of any one of said guideways, said holder having spaced index holes at one end thereof, a locking plunger normally seated in one of said holes when a broach in said holder is in broach-delivery position, power means to advance said holder angularly, manually controlled means to withdraw said plunger and start said power means, and an automatic device effective to cut off said power means and to release said plunger just as an indexing movement of said holder is substantially accomplished.

7. In a broaching machine, a broach holder mounted to rotate about a horizontal longitudinal axis of said machine, a plurality of angularly spaced guideways in said holder for a plurality of elongated broaches, power means to slide a broach into and out of any one of said guideways, power means to index said holder, a locking plunger for said holder, a solenoid to withdraw said plunger, a hand switch effective to close the solenoid circuit and to thereby withdraw said plunger and start said power means, automatic means to hold said solenoid circuit closed, and a device on said holder effective to open said solenoid circuit as the indexing movement is substantially accomplished, and the indexing movement of said holder being fully completed by the inertia of said holder after the solenoid circuit is thus opened.

8. In a broaching machine, an open annular broach holder mounted to rotate about a horizontal longitudinal axis of said machine, external means to support said holder, means to support a plurality of elongated broaches in angularly spaced relation in said holder, a hydraulic cylinder fixed within said annular holder, fixed guideways adjacent said cylinder, an actuator slidable in said guideways, and effective to engage and move a broach out of and into said holder when said broach is in delivery position, a piston in said cylinder, and an operative connection between said piston and said actuator.

9. In a broaching machine, an open annular broach holder mounted to rotate about a horizontal longitudinal axis of said machine, external means to support said holder, means to support a plurality of elongated broaches in angularly spaced relation in said holder, power means to intermittently advance said holder angularly to bring successive broaches in broach-delivery position, and hydraulic broach-sliding means mounted within said annular holder but separate therefrom and automatically engageable with any broach in delivery position.

10. In a broaching machine, an open annular broach holder mounted to rotate about a horizontal longitudinal axis of said machine, external means to support said holder, means to support a plurality of elongated broaches in angularly spaced relation in said holder, a hydraulic cylinder fixed within said annular holder, fixed guideways adjacent said cylinder, an actuator slidable in said guideways, an abutment on said actuator effective to engage and push a broach out of the holder, a latch in said actuator engageable in a notch in the broach to draw a broach into said holder, a piston in said cylinder, and a lost-motion connection between said piston and said actuator, the lost-motion in said connection rendering said latch alternately operative and inoperative before the actuator is moved and as the movement of the piston is alternately reversed.

11. In a horizontal broaching machine, a broach holder, means to slidably support an elongated broach in said holder, an actuator, a plunger effective to move said actuator along a path parallel to said broach-supporting means and having a lost motion connection thereto, said broach having a notch in a non-cutting face thereof, a latch on said actuator, and means to raise said latch into said notch during lost motion between the plunger and actuator and before the actuator is moved to draw the broach into the broach holder.

12. In a horizontal broaching machine, a broach holder, means to slidably support an elongated broach in said holder, an actuator, a plunger effective to move said actuator along a path parallel to said broach-supporting means and having a lost motion connection thereto, said broach having a notch in a non-cutting face thereof and near one end thereof, a latch on said actuator, and a connection between said latch and said actuator operative by cam action during lost motion between the plunger and actuator to raise the latch into the notch in the broach before the actuator is moved to draw the broach into the holder.

13. In a horizontal broaching machine, a broach holder, means to slidably support an elongated broach in said holder, an actuator, means to move said actuator along a path parallel to said broach-supporting means, said broach having a notch in a non-cutting face thereof and near one end thereof, a latch on said actuator, a support for said latch slidable vertically in said actuator, operating means for said actuator slidable horizontally in said actuator and having limited lost motion relative thereto, and a cam connection between said operating means and said latch support effective to raise the latch into the notch in the broach during such limited lost motion between the operating means and the actuator and before the actuator is moved to draw the broach into the holder.

14. In a broaching machine, an open annular broach holder mounted to rotate about a horizontal longitudinal axis of said machine, means to support a plurality of elongated broaches in angularly spaced relation in said holder, rollers underlying and supporting said holder, power means to rotate one of said rollers to angularly advance said holder to bring successive broaches to broach-delivery position, and broach-sliding means mounted in fixed position within said annular holder and coacting only with the broach which is in broach-delivery position in said holder.

OLIVER W. BONNAFE.